Nov. 3, 1959   O. M. WHITTEN   2,911,004
COMPENSATION AND PUMPING VALVE
Filed Nov. 15, 1954
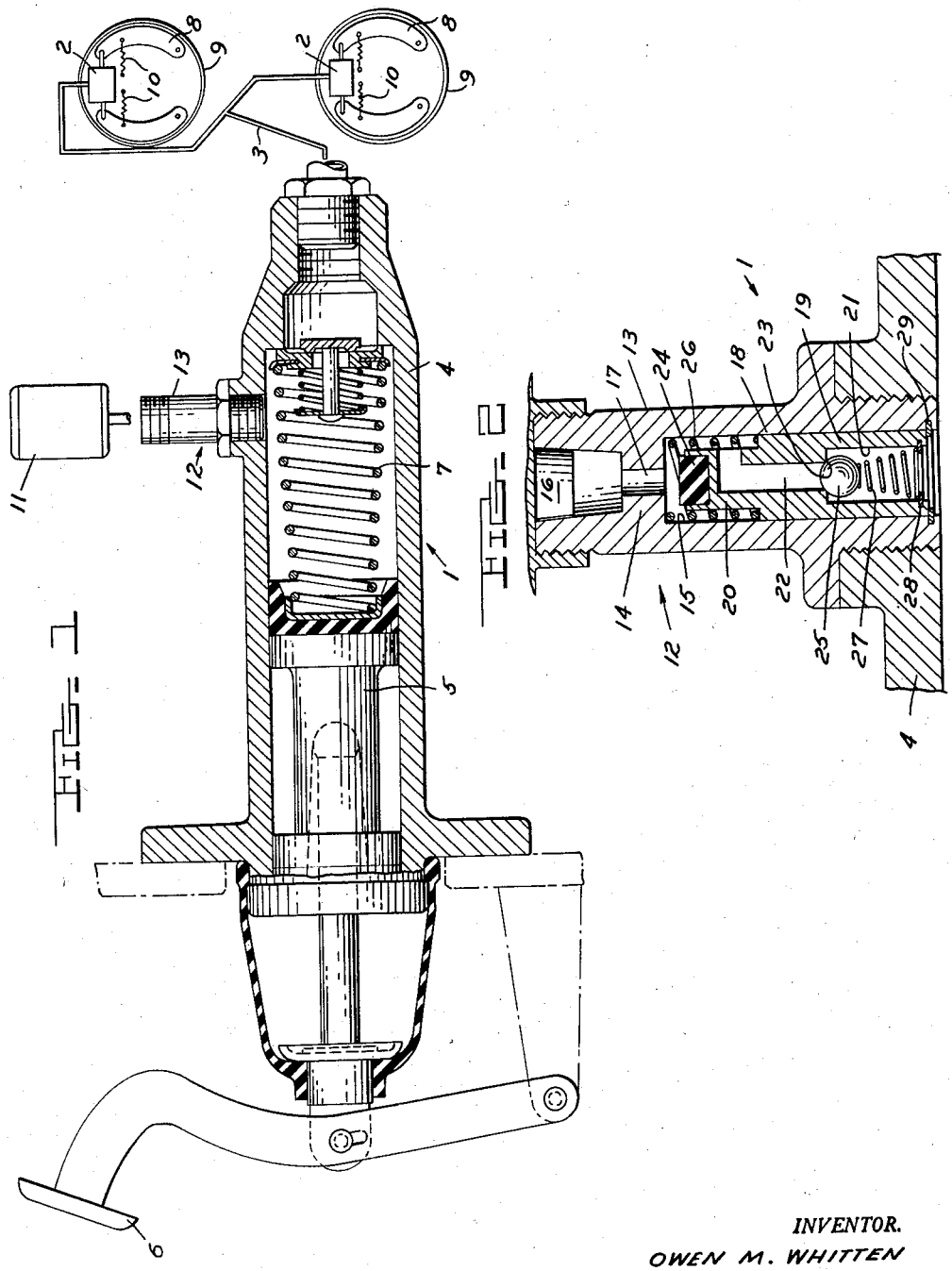
INVENTOR.
OWEN M. WHITTEN
BY
ATTORNEYS

United States Patent Office 2,911,004
Patented Nov. 3, 1959

2,911,004

COMPENSATION AND PUMPING VALVE

Owen M. Whitten, Detroit, Mich., assignor to Kelsey-Hayes Company, a corporation of Delaware Application November 15, 1954, Serial No. 468,625

2 Claims. (Cl. 137—512.2)

The invention relates to compensation and pumping valves and refers more particularly to compensation and pumping valves for hydraulic cylinder and piston assemblies for use in hydraulic brake systems.

The invention has for one of its objects to provide a compensation and pumping valve which is simple in construction and effective in operation.

With this as well as other objects in view the invention resides in the novel features of construction as more fully hereinafter set forth.

In the drawings:

Figure 1 is a schematic view, partly in section, of a hydraulic brake system embodying the invention.

Figure 2 is an enlarged fragmentary sectional view of the compensation and pumping valve shown in elevation in Figure 1.

The compensation and pumping valve is designed for use in hydraulic systems and is particularly applicable to hydraulic brake systems. In the present instance, a conventional hydraulic brake system is schematically shown comprising the master cylinder 1, the wheel cylinders 2, and the tubing 3 connecting the master cylinder and wheel cylinders. The master cylinder has the hydraulic cylinder 4 and the piston 5 reciprocable within the hydraulic cylinder, the piston being movable forwardly by the foot pedal 6 and being movable rearwardly by the coil spring 7. Each wheel cylinder is located between adjacent ends of the pivotal brake shoes 8 and is adapted upon operation of the master cylinder by the foot pedal to apply the shoes to the brake drum 9. The shoes are normally held in off position by one or more retracting springs 10.

To provide for filling the brake system and also to place the brake system normally in communication with the reservoir 11 for the brake liquid, in the off or retracted position of the piston 5, I have provided the compensation and pumping valve 12. The valve comprises the tubular housing 13 threaded into the hydraulic cylinder 4 at its discharge end and formed between its ends with the partition wall 14 dividing the housing into the chambers 15 and 16 which respectively communicate with the hydraulic cylinder 4 and the reservoir 11. The partition wall 14 has the central port 17. The valve also comprises the valve body 18 reciprocable within the chamber 15 toward and away from the partition wall 14 and this valve body has the enlarged portion 19 and the reduced portion 20 between the enlarged portion and the partition wall. The enlarged portion 19 is of smaller diameter than the wall of the chamber 15 to provide clearance therebetween sufficient to enable restricted flow of brake liquid between the enlarged portion and wall. The enlarged and reduced portions are formed with a passage for the brake liquid having the enlarged portion 21 and the reduced portion 22 with the annular valve seat 23 therebetween. The reduced portion 22 of the passage opens through the side wall of the reduced portion 20 of the valve body into the chamber 15. The valve also comprises the disk seal 24 mounted on the end wall of the reduced portion 20 of the valve body and engageable with the partition wall 14 to close the port 17. The valve further comprises the ball valve 25 within the enlarged portion 21 of the passage and engageable with the annular valve seat 23 to close the passage.

To normally hold the valve body away from the partition wall, I have provided the coil spring 26 encircling the reduced portion 20 of the valve body and abutting the partition wall and the shoulder formed by the enlarged portion 19 of the valve body. This coil spring is stronger than the brake shoe retracting springs 10. To normally hold the ball valve 25 against the valve seat 23 to close the passage through the valve body, I have provided the conical coil spring 27 having its smallest convolution engaging the ball valve and its largest convolution engaging the C-washer 28 which is snapped into an interior annular groove in the side wall and at the open end of the enlarged portion 19 of the valve body. To hold the valve body from accidental disengagement from the valve housing, there is the C-washer 29 which is snapped into an internal annular groove in the wall of the tubular housing at the end opening into the hydraulic cylinder 4.

In operation, assuming the brake system to be incompletely filled with brake liquid, it will be seen that by relatively rapidly depressing the foot pedal and allowing it to be raised, the valve functions to pump brake liquid from the reservoir into the brake system. During the depression of the foot pedal 6, the piston 5 will be moved forwardly in the hydraulic cylinder 4 creating hydraulic pressure within this cylinder and moving the valve body 18 outwardly to engage the seal 24 with the partition wall 14 and effectively close the port 17 so that the braking liquid cannot escape through this port to the reservoir 11. Upon return movement of the foot pedal and piston by the usual spring means, pressure within the hydraulic cylinder is reduced and the valve body 18 will move away from the partition wall 14 and the ball valve 25 will move away from its seat 23 so that brake liquid may flow from the reservoir into the interior of the cylinder. Assuming the brake system to be completely filled, it will be seen that upon depression of the foot pedal 6 and forward movement of the piston 5, pressure is created to apply the brakes through the wheel cylinders 2. Upon return of the foot pedal and piston, any excess amount of brake liquid within the brake cylinder will be allowed to escape through the clearance between the valve body and housing wall to the reservoir so that the valve also functions as a compensating valve.

What I claim as my invention is:

1. A compensation and pumping valve for a hydraulic cylinder and piston assembly comprising a valve housing having an elongated chamber adapted for communication at one end with the hydraulic cylinder, said chamber having a port at the opposite end for communication with a hydraulic reservoir, a valve body reciprocable within said chamber toward and away from said port, a seal on said valve body for closing said port upon movement of said valve body toward said port, said valve body being formed with a passage of relatively large cross-section to provide for a relatively unrestricted flow therethrough, said passage connecting said chamber at opposite ends of said valve body at least in all positions of the latter in which said seal is spaced from said port, said passage being formed with a valve seat facing toward said one end of said chamber, a ball on said body engageable with said seat to close said passage, spring means for normally urging said valve body away from said port, and spring means for normally urging said ball toward said seat, said valve body and housing cooperating to provide a compensation passage of relatively small cross-section to provide for a relatively restricted flow therethrough, said compensation passage connecting said chamber at opposite ends of said valve body in all positions of the latter in which said seal is spaced from said port.

2. A compensation and pumping valve for a hydraulic cylinder and piston assembly comprising a valve housing having an elongated chamber adapted for communication at one end with the hydraulic cylinder, said chamber having a port at the opposite end for communication with a hydraulic reservoir, a valve body reciprocable within said chamber toward and away from said port, a seal on said valve body for closing said port upon movement of said valve body toward said port, said valve body being formed with a passage of relatively large cross-section to provide for a relatively unrestricted flow therethrough, said passage connecting said chamber at opposite ends of said valve body at least in all positions of the latter in which said seal is spaced from said port, said passage being formed with a valve seat facing toward said one end of said chamber, a ball on said body engageable with said seat to close said passage, spring means for normally urging said valve body away from said port, spring means for normally urging said ball toward said seat, and a compensation passage connecting said chamber at opposite ends of said valve body at least in all positions of the latter in which said seal is spaced from said port, said compensation passage being of relatively small cross-section to provide for a relatively restricted flow therethrough.

References Cited in the file of this patent

UNITED STATES PATENTS

| | | |
|---|---|---|
| 1,707,993 | Piquerez | Apr. 9, 1929 |
| 2,179,144 | Buttner | Nov. 7, 1944 |
| 2,601,654 | Wright | June 24, 1952 |
| 2,636,511 | Rockwell | Apr. 28, 1953 |
| 2,656,851 | Nichols | Oct. 27, 1953 |